United States Patent [19]

Kowtko

[11] 4,095,707
[45] Jun. 20, 1978

[54] BULK MATERIAL TRANSFER MECHANISM

[75] Inventor: Robert M. Kowtko, Mercerville, N.J.

[73] Assignee: Gould Inc., Rolling Meadows, Ill.

[21] Appl. No.: 734,003

[22] Filed: Oct. 20, 1976

[51] Int. Cl.² .................... B65G 21/02; B65G 65/00
[52] U.S. Cl. .................... 214/301; 214/314
[58] Field of Search .......... 214/310, 312, 314, 301, 214/313, 302, 130

[56] References Cited

U.S. PATENT DOCUMENTS

| 146,117 | 12/1873 | Wilkerson | 214/301 |
|---|---|---|---|
| 1,110,256 | 9/1914 | Dalgleish | 214/301 |
| 1,373,604 | 4/1921 | Dyer | 214/301 |
| 1,879,393 | 9/1932 | Miller | 214/301 |
| 1,953,042 | 3/1934 | Cody | 214/301 |
| 2,164,222 | 6/1939 | Rietfort | 214/301 |
| 2,543,956 | 3/1951 | Buss | 214/301 |
| 2,881,488 | 4/1959 | Schweinberg | 212/130 |
| 3,027,031 | 3/1962 | Woodward et al. | 214/652 |
| 3,111,228 | 11/1963 | Anderson | 212/11 |
| 3,266,648 | 8/1966 | Hackett et al. | 214/313 |
| 3,330,429 | 7/1967 | Kress | 214/314 |
| 3,416,680 | 12/1968 | Thomasovich | 214/313 |
| 3,874,514 | 4/1975 | Wilson | 212/130 |
| 4,009,790 | 3/1977 | Brock | 214/313 |

Primary Examiner—Drayton E. Hoffman
Assistant Examiner—R. B. Johnson
Attorney, Agent, or Firm—Leydig, Voit, Osann, Mayer & Holt, Ltd.

[57] ABSTRACT

A transfer mechanism for dumping the contents of a shipping drum into an open-topped mixing vessel has a rotatable frame spaced above the support surface on which the vessel and drum can be rolled about, the frame having an annular plate and hooks on one side of the plate for lifting and holding the vessel against that side of the plate and a fork on the opposite side of the plate for lifting and holding a drum against that opposite side of the plate. By first picking up the vessel, rotating the frame 180° to turn the vessel upside down, picking up the drum, and rotating the frame to its original position with the drum upside down, the drum contents are transferred to the vessel through the annular plate in a confined manner. A suction chamber is mounted on the transfer mechanism to withdraw any remaining loose material or dust from the shipping drum before it is removed from the transfer mechanism.

4 Claims, 4 Drawing Figures

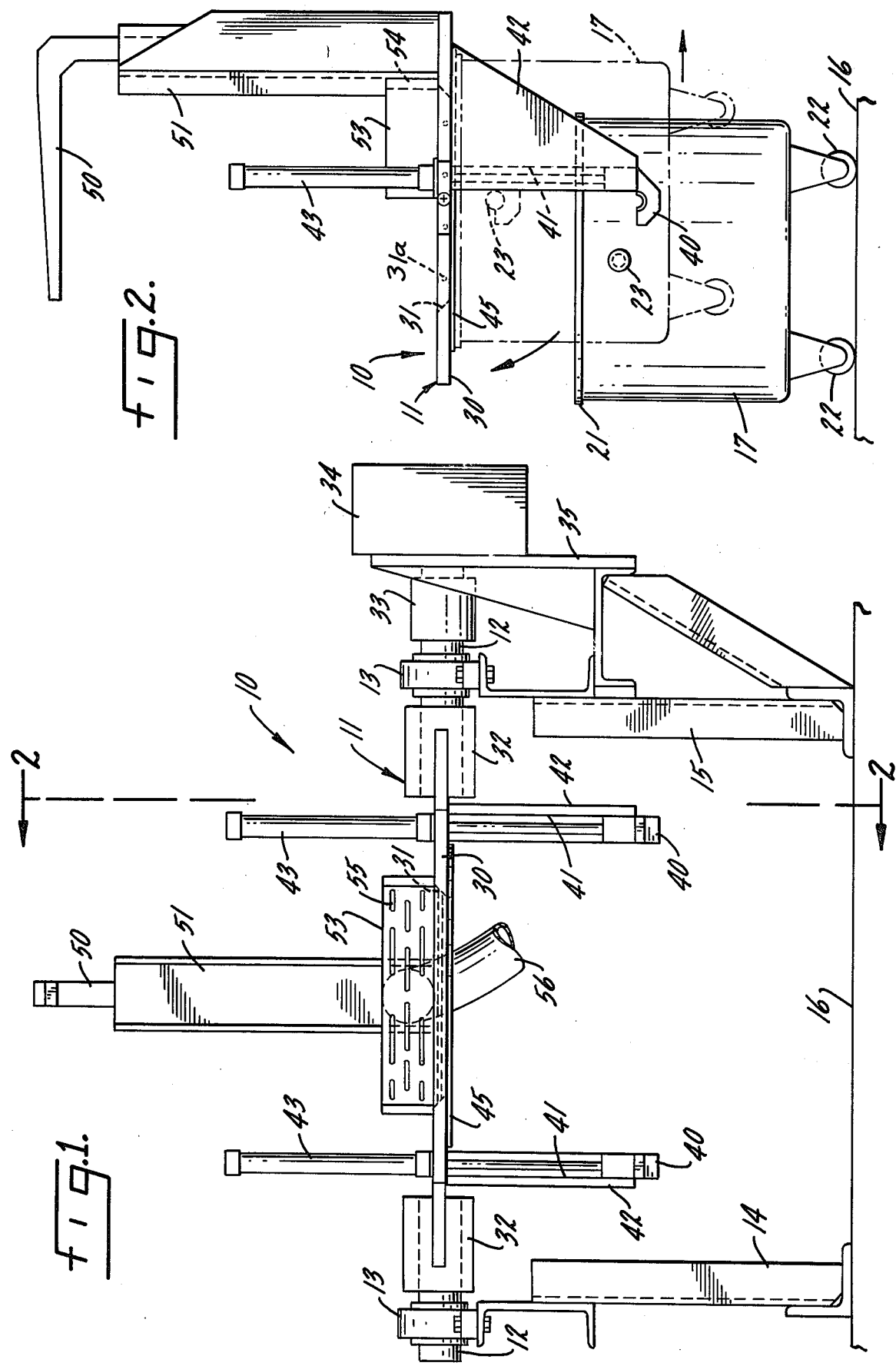

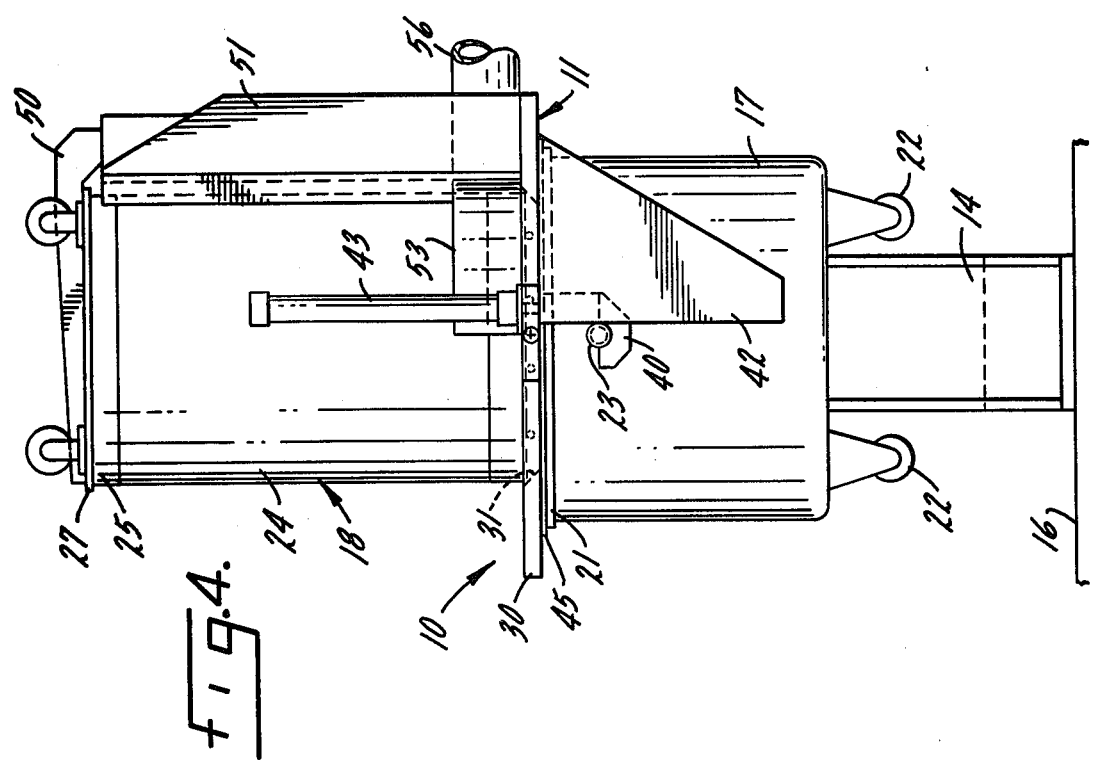
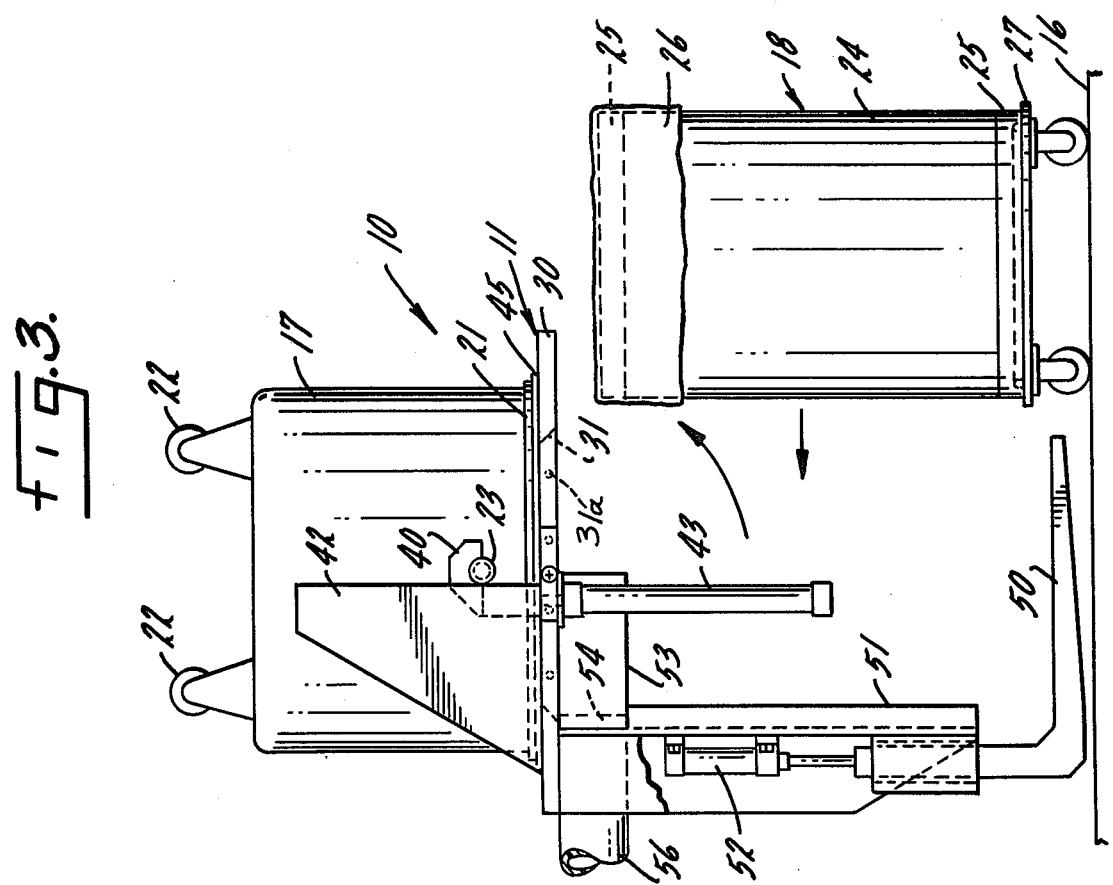

4,095,707

BULK MATERIAL TRANSFER MECHANISM

DESCRIPTION OF THE INVENTION

The present invention relates generally to the handling of bulk material in powder or particulate form and more particularly concerns a mechanism for transferring bulk material from a shipping container to a mixing vessel.

It is common to ship powdered materials in shipping containers such as fiber or steel drums lined with plastic bags. When the material is to be used, the drum is opened and the material dumped into the processing apparatus. Often, the first step is to mix or mill the material to break up conglomerates or to add in additional ingredients. When the material is a powder, dumping a drum into a mixing vessel can produce considerable dust, and if the material is also toxic or at least undesirable to have airborne in dust form — such as lead oxide used in the manufacture of storage batteries — simple dumping is highly unsatisfactory.

Accordingly, it is the primary aim of the invention to provide a transfer mechanism for dumping the contents of shipping drums into mixing vessels without the release of any dust or "smoke". A related object is to provide such a mechanism that effects such a transfer without permitting contamination of the material being transferred.

Another object of the invention is to provide a mechanism as characterized above that gives full power control of the transfer to the operator so as to avoid any hazards from manual handling.

A further object is to provide a mechanism of the above type that is economical to build, and simple and reliable to operate.

Other objects and advantages of the invention will become apparent upon reading the following detailed description and upon reference to the drawings, in which:

FIG. 1 is a front elevation of a transfer mechanism embodying the present invention;

FIG. 2 is a fragmentary side elevation taken substantially along line 2—2 in FIG. 1 with the supporting frame omitted and with an associated mixing vessel shown in two alternate positions;

FIG. 3 is the same side elevation shown in FIG. 2 with the parts rotated 180° and a shipping drum being moved into position; and FIG. 4 is the same side elevation shown in FIGS. 2 and 3 but shows the shipping drum of FIG. 3 locked in place and rotated 180°.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown in FIG. 1 a transfer mechanism 10 embodying the invention and including a frame 11 having oppositely extending stub shafts 12 journalled in bearings 13 mounted at the top of stanchions 14 and 15. The stanchions 14, 15 are fixed to the support surface 16 or floor of the work area in which the mechanism 10 is located, and the frame 11 is thus mounted for at least 180° rotation about a horizontal axis spaced above the surface 16 at a height greater than either that of a mixing vessel 17 (see FIG. 2) or a shipping drum 18 (see FIG. 3).

In the example illustrated, the mixing vessel 17 is an open-topped metal can or tub with an upper reinforcing rim 21 and a plurality of wheels 22 for rolling the vessel about on the surface 16. The vessel includes a pair of opposed, flanged, handling lugs 23. The illustrated shipping drum is of the usual type with a cylindrical fiber body 24, metal end rings 25, and a plastic bag or liner 26 containing the powdered contents. For ease of maneuverability and alignment when loading into the transfer mechanism, the drum 18 is placed on a casterwheeled dolly 27.

The mechanism frame 10 includes an annular plate 30 with a center opening 31 having beveled sides with a top diameter slightly greater than that of the outside diameter of the drum 18 and a bottom diameter slightly less than the inside diameter of the drum 18. This enables the drum 18 to nest within the opening 31 to ensure accurate alignment therewith and to provide a tight seal around the open end of the drum. A plurality of spaced bars 31a extend across the opening 31 to form a grate that catches the plastic bag or liner 26 in the event that it falls out of the drum 18, and to break up any clumps of material falling from the drum 18 into the mixing vessel 17. The sides of the plate 30 are somewhat elongated and affixed to collars 32 that mount the stub shafts 12. One of the stub shafts 12 is coupled by a sleeve 33 to a motor and transmission (not shown) in a power control box 34 mounted on a bracket 35 that is fixed to the stanchion 15. Appropriate controls in the box 34 cause the selective rotation of the frame 11 about its horizontal axis.

A pair of powered hooks 40 are mounted on the frame 11 for engaging the lugs 23 on the vessel 17. The hooks 40 slide in corner grooves 41 formed in brackets 42 secured to one side of the plate 30, and actuators 43 are mounted on the plate 30 and directly secured to the hooks 40 for powered movement of the hooks along their grooves 41. The vessel 17 can be rolled on the surface 16 under the frame 11 until its lugs 23 abut the brackets 42, whereupon operation of the actuators 43 will lift the vessel 17 to hold its open top rim 21 against the plate 30 (see FIG. 2).

Preferably, an annular rubber gasket 45 is mounted on the plate 30 to produce a dust-tight seal between the vessel 17 and the plate 30.

A powered fork 50 is mounted for sliding movement in a bracket 51 fixed to the opposite side of the plate 30 from the hook 40. An actuator 52 (see FIG. 3) moves the fork 50 through the limited distance required to engage the drum 18 and dolly 27 so as to lift them to press the upper end of the drum against the plate 30. In the illustrated embodiment, the open end of the drum is guided into an arcuate shell 53 which forms a suction chamber 54 around a portion of the open top of the drum 18.

Controls for the actuators 43, 52, not shown, are located in the control box 34. Preferably, the actuators 43, 52 can be simple linear, double-acting, pneumatic or hydraulic actuators.

Operation of the mechanism 10 should now be apparent from the above discussion and the several drawing views. The mechanism is initially positioned as shown in FIG. 1. An empty mixing vessel 17 intended to receive a powder such as lead oxide for some industrial process is rolled beneath the mechanism frame 11 so that the vessel lugs 23 abut the brackets 42. The actuators 43 are energized causing the hooks 40 to lift the vessel into firm sealing engagement with the plate 30 and its gasket 45. The frame 11 is then rotated 180° turning the vessel upside down (see FIG. 3). The shipping drum 18 containing the powder which is to be transferred to the vessel 17 is opened and rolled on its dolly 27 beneath the mechanism of frame 11 so that the upper end of the drum is received within the shell 53 against the bracket 51. Energization of the actuator 52 causes the fork or arm 50 to lift the drum 18 and its dolly 27 so that the open top of the drum is pressed firmly against the plate 30.

The entire frame 11 is again rotated 180° (see FIG. 4) so that the contents of the drum fall into the vessel 17. Since this transfer is effectuated through the plate opening 31, with the plate 30 acting as a seal between the vessel 17 and the drum 18, no flying dust or "smoke" is generated. It also follows that this controlled transfer does not permit contamination of the material being transferred.

Depending upon the nature of the material being transferred, it is usually desirable to leave the mechanism 10 in its FIG. 4 position for a short period of time, such as five minutes, to allow all of the powder material being transferred to settle in the vessel 17. After that, the actuators 43 are operated to lower the vessel 17 to the support surface 16 and the vessel rolled away for further processing of its contents. The lightweight drum 18 can either be lifted off the plate 30 after releasing the fork 50, or the frame 11 can again be rotated and the drum lowered to the surface 16 for removal. In either case, a vacuum is drawn on a line 56 communicating with the suction chamber 54 to withdraw any remaining loose powder or dust from the drum 18 into a dust collector (not shown) before the drum is removed from the transfer mechanism. As can be seen most clearly in FIG. 1, the interior surface of the shell 53 is provided with a plurality of longitudinal slots 55 to distribute the suction around the entire interior of the suction chamber 54. The interior of the drum 18 is placed in communication with the chamber 54 by separating the drum a vertical distance from the plate 30 that does not exceed the height of the shell 53. The mode of operation is apparent in considering FIGS. 1 and 4.

Those skilled in the art will appreciate that the mechanism 10, although giving full powered control of the bulk transfer, is quite simple in design and hence is economical to build and simple and reliable to operate.

I claim as my invention:

1. A material transfer mechanism for dumping the contents of an opened shipping drum into an open-topped mixing vessel with lugs thereon comprising, in combination, a frame, means mounting said frame on a support surface for 180° rotation about a fixed horizontal axis spaced above said surface at a height greater than that of said drum and said vessel, said frame including an annular plate with a center opening slightly less than the open diameter of said drum, a pair of powered hooks mounted on said frame for engaging said lugs on said vessel when the vessel is positioned beneath said plate, means for vertically moving said hooks for lifting said engaged vessel so that its open top is held against said plate, powered arm means mounted on said frame on the opposite side of said plate from said hooks, means for rotating said frame 180° about said axis so as to turn said engaged vessel upside down and position said arm means close to said support surface and beneath said drum, and means for moving said arm means independently of said hooks for lifting said drum so that its upper open end is pressed against said plate, whereupon further actuation of said means for rotating said frame to return the frame 180° to its original position turns said drum upside down to dump its contents into the vessel through said center opening.

2. The combination of claim 1 including a rubber gasket on one side of said plate so as to provide a seal between the plate and the open top of said vessel.

3. The combination of claim 1 in which said means for moving said hooks and said arm are linear, double-acting actuators.

4. The combination of claim 1 which includes means for drawing a suction between the open top of said drum and said annular plate for removing any remaining dust from the drum after the dumping thereof.

* * * * *